United States Patent
Ostrovsky

(10) Patent No.: US 8,664,886 B2
(45) Date of Patent: Mar. 4, 2014

(54) TIMER-BASED SWITCHING CIRCUIT SYNCHRONIZATION IN AN ELECTRICAL DIMMER

(75) Inventor: Michael Ostrovsky, Brooklyn, NY (US)

(73) Assignee: Leviton Manufacturing Company, Inc., Melville, NY (US)

( * ) Notice: Subject to any disclaimer, the term of this patent is extended or adjusted under 35 U.S.C. 154(b) by 194 days.

(21) Appl. No.: 13/334,760

(22) Filed: Dec. 22, 2011

(65) Prior Publication Data

US 2013/0162168 A1   Jun. 27, 2013

(51) Int. Cl.
G05F 1/00 (2006.01)
H05B 41/24 (2006.01)

(52) U.S. Cl.
USPC .......................................... 315/291; 315/247

(58) Field of Classification Search
USPC ................... 315/291, 307, 246, 247
See application file for complete search history.

(56) References Cited

U.S. PATENT DOCUMENTS

| | | |
|---|---|---|
| 3,678,291 A | 7/1972 | Coe |
| 4,010,386 A | 3/1977 | Rossell |
| 4,096,884 A | 6/1978 | Horowitz |
| 4,296,449 A | 10/1981 | Eichelberger |
| 4,365,164 A | 12/1982 | Sibley |
| 4,396,869 A | 8/1983 | Rosenbaum et al. |
| 4,427,863 A | 1/1984 | Fujita |
| 4,581,705 A | 4/1986 | Gilker et al. |
| 4,675,987 A | 6/1987 | Minks et al. |
| 4,739,351 A | 4/1988 | Feldman |
| 4,829,457 A | 5/1989 | Russo et al. |
| 4,835,502 A | 5/1989 | Minnette |
| 5,258,889 A | 11/1993 | Belanger, Jr. |
| 5,335,135 A | 8/1994 | Kinney |
| 5,336,979 A | 8/1994 | Watson et al. |
| 5,338,908 A | 8/1994 | Rahman et al. |
| 5,359,486 A | 10/1994 | Crane et al. |
| 5,619,081 A | 4/1997 | Gershen et al. |

(Continued)

FOREIGN PATENT DOCUMENTS

| | | |
|---|---|---|
| EP | 0039869 A1 | 4/1981 |
| EP | 2214287 A2 | 8/2010 |

(Continued)

OTHER PUBLICATIONS

Gallo et al., Office Action for U.S. Appl. No. 13/334,705, filed Dec. 22, 2011, (U.S. Patent Publication No. 20130162167) dated Oct. 1, 2013.

(Continued)

Primary Examiner — Minh D A
(74) Attorney, Agent, or Firm — Claudio Buttitta, Esq.; Matthew M. Hulihan, Esq.; Heslin Rothenberg Farley & Mesiti P.C.

(57) ABSTRACT

Timer-based switching circuit synchronization in an electrical dimmer is provided. The energizing of a switching circuit in a dimmer is synchronized with an AC wave to facilitate providing by the dimmer electrical power to a load. The synchronizing includes starting a timer having a predetermined timeout, responsive to receipt of a zero-crossing signal. Responsive to receipt of a subsequent zero-crossing signal prior to reaching the timeout, the timer is restarted, and responsive to expiration of the timeout, a switching circuit is energized at a predetermined firing angle with respect to the zero-crossing signal to supply electrical power to the load.

17 Claims, 3 Drawing Sheets

(56) References Cited

U.S. PATENT DOCUMENTS

| | | | |
|---|---|---|---|
| 5,644,463 A | 7/1997 | El-Sharkawi et al. | |
| 5,784,285 A | 7/1998 | Tamaki et al. | |
| 5,814,966 A * | 9/1998 | Williamson et al. | 318/798 |
| 5,847,555 A | 12/1998 | Lewis | |
| 5,930,104 A | 7/1999 | Kadah et al. | |
| 5,971,597 A | 10/1999 | Baldwin et al. | |
| 6,002,313 A | 12/1999 | Mrenna et al. | |
| 6,188,181 B1 | 2/2001 | Sinha et al. | |
| 6,198,063 B1 | 3/2001 | Kramer | |
| 6,232,855 B1 | 5/2001 | Malingowski et al. | |
| 6,233,132 B1 | 5/2001 | Jenski | |
| 6,456,511 B1 | 9/2002 | Wong | |
| 6,497,656 B1 | 12/2002 | Evans et al. | |
| 6,512,682 B2 | 1/2003 | Cohen et al. | |
| 6,525,542 B2 | 2/2003 | Price | |
| 6,633,823 B2 | 10/2003 | Bartone et al. | |
| 6,693,395 B2 | 2/2004 | Wilhelm | |
| 6,724,157 B2 | 4/2004 | Kazanov et al. | |
| 6,741,442 B1 | 5/2004 | McNally et al. | |
| 6,768,615 B2 | 7/2004 | Liu | |
| 6,897,760 B2 | 5/2005 | Kawata et al. | |
| 6,903,554 B2 | 6/2005 | Wilson et al. | |
| 6,993,417 B2 | 1/2006 | Osann, Jr. | |
| 7,046,716 B1 | 5/2006 | Miao | |
| 7,110,225 B1 | 9/2006 | Hick | |
| 7,141,891 B2 | 11/2006 | McNally et al. | |
| 7,171,461 B2 | 1/2007 | Ewing et al. | |
| 7,190,125 B2 | 3/2007 | McDonough et al. | |
| 7,196,900 B2 | 3/2007 | Ewing et al. | |
| 7,236,338 B2 | 6/2007 | Hale et al. | |
| 7,242,563 B2 | 7/2007 | Hua et al. | |
| 7,368,830 B2 | 5/2008 | Cleveland et al. | |
| 7,538,645 B2 | 5/2009 | Nishi et al. | |
| 7,683,755 B2 | 3/2010 | Ostrovsky et al. | |
| 2001/0039626 A1 | 11/2001 | Jauert | |
| 2003/0062990 A1 | 4/2003 | Schaeffer, Jr. et al. | |
| 2003/0161279 A1 | 8/2003 | Sherman | |
| 2004/0034484 A1 | 2/2004 | Solomita et al. | |
| 2004/0054905 A1 | 3/2004 | Reader | |
| 2004/0155722 A1 | 8/2004 | Pruchniak | |
| 2005/0147071 A1 | 7/2005 | Karaoguz et al. | |
| 2005/0185669 A1 | 8/2005 | Welborn et al. | |
| 2005/0203987 A1 | 9/2005 | Ewing et al. | |
| 2005/0243787 A1 | 11/2005 | Hong et al. | |
| 2006/0007627 A1 | 1/2006 | Lewis | |
| 2006/0094461 A1 | 5/2006 | Hameed et al. | |
| 2006/0259538 A1 | 11/2006 | Ewing et al. | |
| 2007/0076340 A1 | 4/2007 | Ewing et al. | |
| 2007/0081505 A1 | 4/2007 | Roberts | |
| 2007/0112939 A1 | 5/2007 | Wilson et al. | |
| 2007/0130243 A1 | 6/2007 | Ewing et al. | |
| 2007/0136453 A1 | 6/2007 | Ewing et al. | |
| 2007/0140238 A1 | 6/2007 | Ewing et al. | |
| 2007/0198748 A1 | 8/2007 | Ametsitsi | |
| 2008/0019063 A1 | 1/2008 | Muller et al. | |
| 2008/0019068 A1 | 1/2008 | Reynolds et al. | |
| 2008/0112097 A1 | 5/2008 | Maharsi | |
| 2008/0136261 A1 | 6/2008 | Mierta | |
| 2009/0021213 A1 | 1/2009 | Johnson | |
| 2009/0027219 A1 | 1/2009 | Ostrovsky et al. | |
| 2009/0259603 A1 | 10/2009 | Housh et al. | |
| 2009/0285189 A1 | 11/2009 | Kim et al. | |
| 2010/0090618 A1 | 4/2010 | Veltman | |
| 2011/0080111 A1* | 4/2011 | Nuhfer et al. | 315/291 |
| 2011/0115460 A1 | 5/2011 | Elliott et al. | |
| 2011/0118890 A1 | 5/2011 | Parsons | |
| 2011/0199014 A1 | 8/2011 | Pitigoi-Aron et al. | |
| 2011/0199017 A1 | 8/2011 | Dilger | |
| 2011/0204778 A1 | 8/2011 | Sadwick et al. | |
| 2011/0204820 A1 | 8/2011 | Tikkanen et al. | |
| 2011/0285301 A1 | 11/2011 | Kuang et al. | |
| 2013/0162167 A1 | 6/2013 | Gallo | |

FOREIGN PATENT DOCUMENTS

| | | |
|---|---|---|
| JP | 2008302771 | 12/2008 |
| WO | 9010942 A1 | 9/1990 |
| WO | 0182321 A1 | 1/2001 |
| WO | 2006091565 A2 | 8/2006 |
| WO | 2008102147 A1 | 8/2008 |
| WO | 2011101282 A1 | 8/2011 |
| WO | 2011101680 A2 | 8/2011 |

OTHER PUBLICATIONS

Leviton, Product Data "Z-MAX Relay Cards," 2009, 2 pages.
Lighting Controls, "Lighting Control & Design—Product Catalog," Oct. 2008, 101 pages.
SVEA Building Control Systems—LON I/O Module REG-M DIM 1-10V, May 16, 2007, 4 pages.
Wattsupmeters, Smart Circuit, "Electricity Controller—Applications," Mar. 30, 2010, 2 pages.
Wattsupmeters, Smart Circuit, "Methodology for Commercial Applications," Mar. 30, 2010, 2 pages.
Wattsupmeters, Smart Circuit, "The Intelligent Electricity Monitor that can Measure and Switch Loads via the Internet," Mar. 30, 2010, 2 pages.
Wattsupmeters, Smart Circuit, "20 AMP Internet Enabled Electricity Controller," Product Information, 2005, 2 pages.
Written Opinion and International Search Report for PCT/US2010/044022, dated Feb. 24, 2011, 10 pages.
U.S. Appl. No. 12/751,956, filed Mar. 31, 2010, 87 pages.
ADMMicro EMS, "Controllers," 2006, 1 page.
ADMMicro, "What We Do," Controllers, 2006, 3 pages.
Architectural Lighting Magazine, "Load Shedding and Lighting: The New Frontier," printed Mar. 20, 2009, 2 pages.
E-Mon, Energy Monitoring Products, E-Mon D-Mon Metering Products, printed Jul. 7, 2009, 1 page.
I.M.S. Industrial Measurement Systems Ltd., "General Information," 2006, 2 pages.
Leviton, "Architectural Lighting Controls," 2007, 21 pages.
Lutron, "Quantum—Whole-Building Light Management Solution," Apr. 30, 2009, 28 pages.
Quad Logic: Power Line Communications Technology, "Where There is Power . . . Quadlogic Brings You Knowledge," 2008, 2 pages.
Shadowmetering, "About Shadow Metering Inc. Jacksonville, Florida," 2009, 1 page.
Site Controls: Products and Services, "The Site-Command Platform," 2009, 1 page.
Wattsupmeters, "Smart Circuit—The Intelligent Electricity Monitor that Can Measure and Switch Loads via the Internet, Sep. 2005," 6 pages.
Society of Automotive Engineers, Inc., Surface Vehicle Recommended Practice, 2001, 32 pages.
GM Electric Power/Advanced Systems, "Plug-In Electric Vehicles—Standards," Ontario Smart Grid Forum, Oct. 14, 2008, 17 pages.
RS485 serial information, http://www.lammertbies.nl/comm/info/RS-485.html. 3 pages.
International Preliminary Report on Patentability for PCT/US2010/044022, dated May 15, 2012, 6 pages.
Elliott et al., Office Action for U.S. Appl. No. 12/751,993, filed Mar. 31, 2010, (U.S. Patent No. 8,324,761) dated May 10, 2012.
Elliott et al. Notice of Allowance for U.S. Appl. No. 12/751,993, filed Mar. 31, 2010, (U.S. Patent No. 8,324,761 dated Aug. 8, 2012.

* cited by examiner

TIMER-BASED SWITCHING CIRCUIT SYNCHRONIZATION IN AN ELECTRICAL DIMMER

BACKGROUND

In an electrical load dimmer, a technique known as zero-crossing detection is conventionally employed, wherein the dimmer is synchronized with one or more phases of an input line voltage to enable the dimmer to properly fire a load-controlling switch, such as a Triode for Alternating Current (TRIAC), at specific times with respect to the input line phase. Typically, a zero-crossing is detected by detecting either a voltage zero-crossing or a current zero-crossing of the input power phase.

Synchronization between the input power phase and the load-controlling switch of the dimmer advantageously facilitates proper functioning of the electrical dimmer. For instance, timing of the firing of the switching element controls the power applied to the load and, as a result, light output of the load to which the electrical dimmer supplies power. However, due to properties of some electrical loads, such as self ballast light-emitting diode (LED) and compact fluorescent lamp (CFL) bulbs, especially in cases where a neutral connection to the dimmer is not available, conventional synchronization methods do not adequately synchronize the electrical dimmer with the power phase, resulting in undesired behavior of the electrical load. It would be helpful to develop a system and method that mitigates some of the problems with the prior art.

BRIEF SUMMARY OF THE INVENTION

The shortcomings of the prior art are overcome and additional advantages are provided through a dimmer for controlling electrical power of an AC wave to a load. In one embodiment, the dimmer includes a line input terminal and a load output terminal, the line input terminal coupled to the AC wave, and the load output terminal coupled to the load, a switching circuit electrically coupled between the line input terminal and the load output terminal, the switching circuit controlling a supply of electrical power to the load, a controller to synchronize firing the switching circuit to provide electrical power to the load, a timer having a predetermined timeout, and a zero-crossing signal indicative of the zero-crossing of the AC wave, wherein receipt of the zero-crossing signal starts the timer, wherein if a subsequent zero-crossing signal is received prior to reaching the timeout, the timer is restarted, and wherein responsive to reaching the timeout, the controller fires the switching circuit at a predetermined firing angle with respect to the zero-crossing signal to supply electrical power to the load.

In a further aspect, a method is provided for selectively providing electrical power to a load by controlling a switching circuit with respect to a zero-crossing of an AC wave. In one embodiment, the method includes receiving a zero-crossing signal indicative of the occurrence of the zero-crossing of the AC wave, responsive to the zero-crossing signal, starting a timer for a predetermined time interval, wherein if a subsequent zero-crossing signal is received prior to the predetermined time interval elapsing, the timer is restarted, and responsive to expiration of the predetermined time interval, energizing the switching circuit at a predetermined firing angle with respect to the zero-crossing signal and providing electrical power to the load.

Additional features and advantages are realized through the concepts of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Disclosed herein are various dimmers for controlling electrical power of an alternating current (AC) wave to a load. As explained in detail below, in accordance with one aspect of the present invention, timer-based switching circuit synchronization is provided for use in controlling switching of the electrical power to the load.

Prior art methods of providing synchronization using zero-crossing detection in two-wire devices (which have input line and output load terminals, but do not have a separate neutral connection or ground leakage path) can be problematic. For instance, the capacitive properties and switch-mode power supplies of some loads, such as LED loads, can introduce fluctuations in the polarity of the load current. After current through the load falls below a holding current of a current controlled switching component, such as a Triode for Alternating Current (TRIAC) or a silicon-controlled rectifier (SCR), which occurs, for instance, when an internal rectifier capacitor inside a self ballast bulb reaches a voltage above a momentary voltage in the AC line, diodes in the bridge rectifier stop conducting and the TRIAC will be shut off, as current through it will be below the holding current, and this happens usually before the real zero-crossing. The resulting synchronization signals depend on processes between a power supply of the dimmer and lamp(s), and also depend on a firing angle on the AC wave, the number, and the type of bulb attached to the dimmer. Consequently, zero-crossing detection through the traditional means of detecting a change in polarity can be problematic. Multiple reversals of the polarity of the input-to-output voltage may occur near a zero-crossing, resulting in a zero-crossing waveform that exhibits multiple fluctuations that can cause false-triggers. As those having ordinary skill in the art will recognize, zero-crossing can refer both to crossing a zero voltage level (or current) or to crossing a value relatively close to the zero voltage (or current) value. Principles disclosed herein apply to zero-crossings under both scenarios.

The present invention addresses the above problem by providing timer-based switching circuit synchronization. Synchronization for firing a switching circuit of a dimmer with a power phase is facilitated by a timer that is started when a zero-crossing is indicated by a zero-crossing signal. Expiration of the timer indicates that a zero-crossing has taken place. Between the start and the expiration of the timer, each time an additional zero-crossing signal is received, the expiration of the timer is further delayed by way of restarting the timer. After a last zero-crossing signal is received for a zero-crossing of the power phase, the timer expires, indicating that the zero-crossing is complete.

Figure 1:
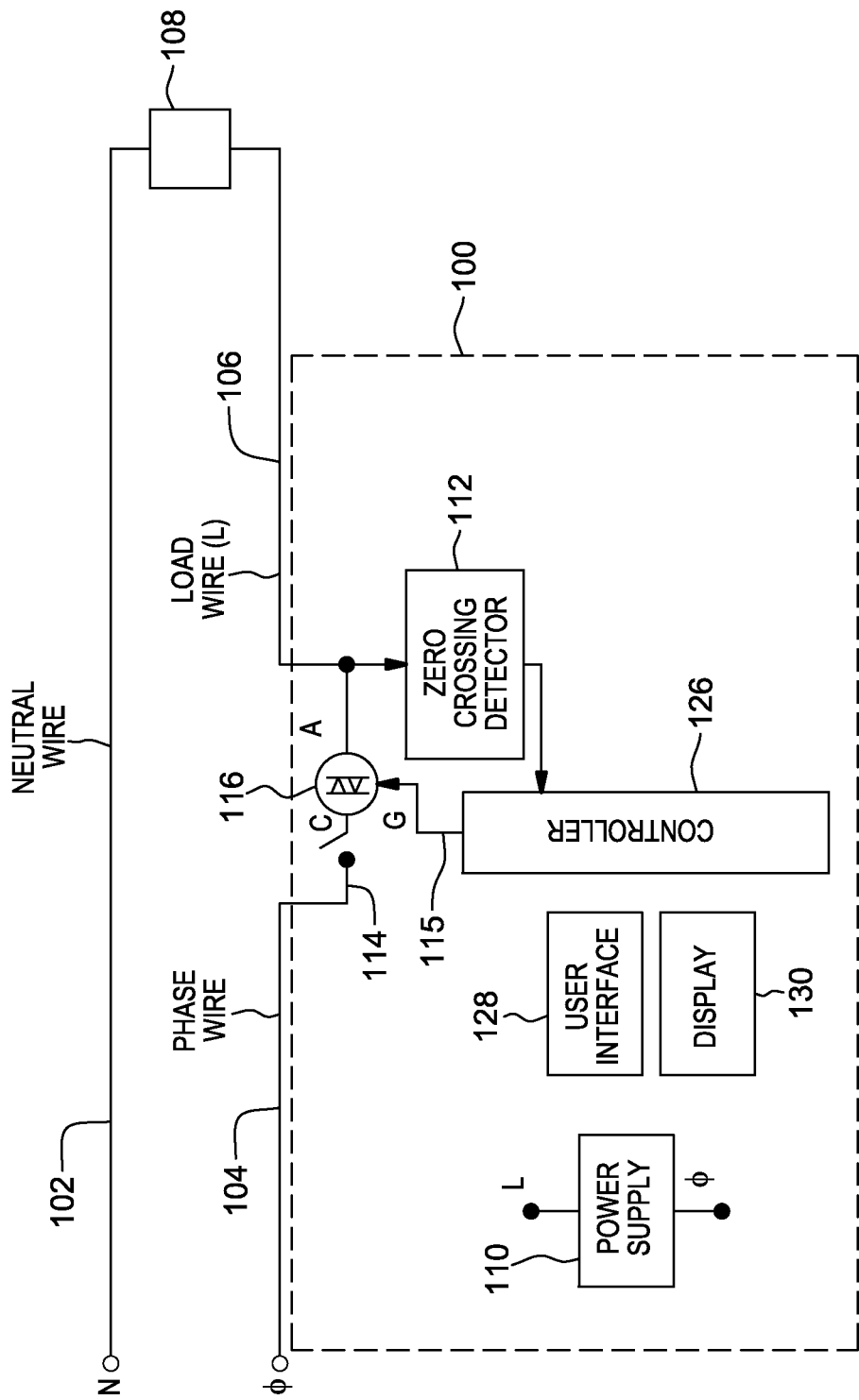
FIG. 1 depicts one embodiment of a dimmer for incorporating one or more aspects of the present invention.

FIG. 1 depicts one embodiment of a dimmer that incorporates one or more aspects of the present invention to facilitate providing electrical power to a load. In FIG. 1, load control switch 100 (also referred to herein as a "dimmer" or "dimmer switch") is able to activate, and control power to, a load 108 which includes an electrical device. Control switch 100 includes a controller 126 in communication with a user interface 128 and a display 130. Controller 126 may include, but is not limited to, a complex instruction set computer processor and/or a reduced instruction set computer processor. In one example, user interface 128 includes one or more actuators for actuation by a user, and a user of control switch 100 is able to engage one or more of the actuators, which controller 126 may interpret as a command (or a set of commands) to perform one or more actions for controlling load 108. In response to the received command information, control switch 100 can then control load 108.

Dimmer 100 includes line input terminal 104 to facilitate connection to a source of electricity (via a phase wire) and load output terminal 106 to facilitate connection to a load (via a load wire). As shown in FIG. 1, dimmer 100 controls load 108. Load 108 can be any type of device that may be controlled by a switch, which may include, but is not limited to, a light fixture having a lighting element, a fan, a household appliance, etc. In addition, dimmer 100 includes a power supply circuit 110 coupled to the phase and load wires. Power supply 110 uses well known circuits that are used to convert an alternating current (AC) signal to a direct current (DC) (or voltage) that may be used to power electronic circuits.

Dimmer 100 includes controller 126, such as a microprocessor, for providing one or more signals to switching circuit 116, to control the switching of electrical power to load 108. In one embodiment, dimmer 100 controls the amount of current flowing through load 108 by proper activation of a switching circuit 116. Switching circuit 116 is electrically coupled between line input terminal 104 and load output terminal 106 for controlling supply of electrical power to load 108. In FIG. 1, switching circuit 116 comprises a Triode for Alternating Current (TRIAC), which is a bidirectional three terminal semiconductor device that allows bidirectional current flow when an electrical signal of proper amplitude is applied to its "G" (or gate) terminal. Switching circuit 116 also has a "C" (or cathode) terminal and an "A" (or anode) terminal. When an electrical signal is applied to the gate G, switching circuit 116 is said to be gated. When properly gated, current (or other electrical signal) can flow from the "C" terminal to the "A" terminal or from the "A" terminal to the "C" terminal. When switching circuit 116 is not gated or is not properly gated, relatively little or substantially no current (or no signal) can flow between the "A" and "C" terminals. Switching circuit 116 thus acts as an electrically controlled switch which can allow some or no current flow based on the amplitude of the electrical signal applied to its "G" terminal. Alternatively, switching circuit 116 can be implemented as multiple switches, such as two TRIACs TR1 and TR2 (not shown), where TRIAC TR1 is controlled by controller 126 which applies a fire signal onto control line 115 to turn on TRIAC TR2, which in turn gates TRIAC TR1 allowing an AC signal to pass through load 108 and back to the power source via neutral wire 102.

Connected in series to switching circuit 116 is mechanical switch 114. Mechanical switch 114 can be an "air gap switch" that can be activated to stop current flow through phase wire 104, load wire 106, load 108, and neutral wire 102. Electrical energy from a source (not shown) provides current that flows from phase terminal (Φ) through phase wire 104, mechanical switch 114, switching circuit 116, load wire 106, load 108, neutral wire 102 and back to the electrical energy source through neutral terminal N. The amount of current flowing through the phase and neutral wires will determine the intensity of the load. Switching circuit 116 can be gated to provide current amounts related to intensities of load 108 (for example intensity of the light if load 108 comprises a lighting element, fan speed if load 108 comprises a fan, etc.) or can be gated to provide substantially no current, thus essentially switching off load 108.

Electrical energy can be provided to load 108 by the phase (Φ)) and neutral (N) terminals. With mechanical switch 114 closed, the electrical energy can be controlled by switching circuit 116 to switch on load 108, increase or decrease the intensity of load 108, or switch off load 108. When mechanical switch 114 is open, no current flows through load 108. Opening up mechanical switch 114 is referred to as a "hard switch off" which allows a user to, for instance, change or replace a lamp in load 108 without risk of an electrical shock.

Dimmer 100 includes controller 126 which can be coupled to zero-crossing detector circuit 112 and user interface circuit 128. Controller 126 can control the operation of switching circuit 116. Controller 126 can be a well-known processor semiconductor integrated circuit (i.e., microprocessor "chip") or a control circuit designed to perform certain actions depending on the status of various inputs, or a combination of a microprocessor and a control circuit. The electrical energy flowing through load 108 can be a 120/220 volt AC (alternating current), 60/50 Hz signal. The AC signal (current and/or voltage) may be a sinusoidal voltage signal symmetrically alternating about a zero volt reference point in a series of phases, with each phase comprising a positive and a negative half-phase. The AC signal flowing through phase wire 104, mechanical switch 114, switching circuit 116 and load wire 106 is applied to the input of zero-crossing detector 112. Zero-crossing detector 112 detects zero-crossings of the line signal, which occur every half cycle. Controller 126 uses the output of zero-crossing detector 112, in the form of a zero-crossing waveform, for various timing functions such as the proper timing of signals it generates to control switching circuit 116. Zero-crossing detector 112 can be implemented with diodes and resistors. The AC signal on the load wire 106 can be applied to a resistor which acts as a current limiting resistor. Diodes serve to limit the AC signal to a relatively small voltage that can be handled by controller 126. For instance, at each zero-crossing of the AC signal, diode(s) limit an ensuing positive half cycle to +5 volts or an ensuing negative half cycle to approximately zero volts. The resulting waveform thus switches from zero volt to 5 volts or from 5 volts to zero volts at each zero-crossing of the AC signal.

As noted, with an alternating current line voltage on line wiring 106, the instantaneous voltage across switching circuit 116 can vary around zero volts. Accordingly, zero-crossing detector 112 can be configured to detect zero-crossings of the voltage on the line wiring. In another embodiment, the zero-crossing can be a current zero-crossing. The zero-crossing detector 112 can be configured to sense such a current zero-crossing. Accordingly, the zero-crossing detector 112 can be configured to sense a variety of zero-crossings including both voltage and current zero-crossings. Moreover, the zero-crossing detector 112 can be configured to detect multiple zero-crossings. For example, depending on the load 108, the zero-crossing of the current can be out of phase with the voltage zero-crossing, in which case zero-crossing detector 112 can be configured to sense both the voltage zero-crossings and the out-of-phase current zero-crossings. Zero crossing detector 112 synchronizes control pulses with power line frequency and generates an output signal when can indicate an input polarity change or crossing of a predetermined threshold.

Although zero-crossing detector 112 is illustrated coupled to phase wiring 104 and electrical switching device 116, zero-crossing detector 112 can be coupled to any appropriate circuitry to sense the corresponding zero-crossings.

Zero-crossing detector 112 can be coupled to controller 126. Accordingly, controller 126 can be configured to report the zero-crossings, operate in response to the zero-crossings, or the like. For example, the controller 126 can be configured to actuate switching circuit 116 responsive to a zero-crossing signal received from the zero-crossing detector 112.

Controller 126 can control switching circuit 116 through control line 115. The controller can control the amount of current flowing through load 108 by applying a certain signal to the gate of switching circuit 116 through control line 115. The amount of current flowing through load 108 will depend on the duty cycle (ratio of switch ON time period to switch OFF time period) of the controller-generated signal applied to the gate of switching circuit 116. Thus, the intensity of load 108, such as the intensity of light emitted, if load 108 comprises a lighting element, also will depend on this signal.

A user can operate dimmer 100 to control load 108 by engaging user interface 128, for instance one or more actuators (e.g. switches, slide controls, etc.) thereof. The actuators can be any mechanical, electromechanical, and/or electro-optical device(s) that are controllable by a user. For example the actuators can be a rotating wheel mechanism(s) that allows a user to control the intensity of load 108 or turn ON or OFF load 108. The actuators may enable a user to control predetermined aspects of the load 108. For example, if the load includes a light bulb, one actuator may be an ON/OFF switch for the light bulb, another actuator may be an intensity switch to increase the intensity of light emitted by the light bulb, and yet another actuator can be an intensity switch used to decrease the intensity of light emitted by the light bulb. Typically, one switch will toggle between on and off and two other switches will control dimming and/or brightness functions. In one embodiment, switch 114 will turn the load on and off, and a slider of user interface 128 will adjust the power applied to the load, e.g to adjust light output of the load. In addition, the actuators and/or switch 114 can be "micro switches" that may be mounted on a printed circuit board disposed within a circuit housing of the dimmer.

During normal operation, mechanical switch 114 is closed allowing current flow to load 108 when switching circuit 116 is switched on by controller 126. When a user engages user interface 128 (for instance an actuator thereof) to either switch ON or OFF load 108, controller 126 detects this action by the user and interprets the user's command and, in response, turns ON or OFF load 108. Processor 126 can switch load 108 ON or OFF by providing an appropriate signal to the gate of switching circuit 116 through control line 115. Similarly, when a user engages one or more actuators to either increase or decrease the intensity of load 108, controller 126 applies a signal to the gate of switching circuit 116 via control line 115 to achieve the desired intensity. Controller 126 also can activate a number of LEDs in a display circuit 130 of the dimmer to indicate the current intensity of load 108. When load 108 is switched OFF, a status LED may be switched ON to notify the user that load 108 is OFF and, in the case of a light, to allow the user to locate the dimmer that may now be in a darkened room. When load 108 is ON, the status LED is OFF. Therefore, dimmer 100 is able to indicate the status of load 108 through the use of display circuit 130 having LEDs and a separate ON/OFF indicator LED. For example, for a fan, the LEDs may be indicia of the speed at which the fan is currently rotating.

In dimmer 100, an ON/OFF actuator and an intensity control switch may be operated by a user to implement specific commands, such as OFF, and ON. In one embodiment, when load 108 is OFF and a user desires to switch it ON, the user can actuate an ON/OFF switch once causing one switch closure which is detected by controller 126 which engages switching circuit 116 to switch ON load 108 or to switch ON load 108 at a particular fade rate where the load intensity will reach a predefined preset level. The fade rate is a measure of how quickly (or how many times) the load intensity changes from one intensity to another during a defined time period. The fade rate can be a programmed fade rate. The preset level is either a level programmed into the dimmer by the user while the dimmer was in a programming mode, or is a level selected by the user using the intensity switches prior to load 108 being switched ON. It should be noted that in one embodiment, a switch closure caused by the user is interpreted as such by controller 126 only when there is at least a one second pause following the switch closure. During the pause, no switch closures are performed by the user. Multiple taps (in succession of less than one (1) second between each tap) to the ON/OFF switch will not cause anything to occur.

In another embodiment, dimmer 100 can have a dim-lock feature which can be turned on or off. The dim-lock feature is the ability for dimmer 100 to have load 108 go to the same preset intensity level whenever the load 108 is switched ON. When the dim-lock feature is ON, dimmer 100 causes load 108 intensity (or brightness) to rise to a preset level when load 108 is switched ON. While the dim-lock feature is ON, a user can temporarily override it by manipulating the intensity switches to temporarily select a new intensity level while load 108 is OFF; then when load 108 is switched ON, it will go to the new level either instantly or at a programmed fade rate. However, if load 108 is switched OFF and then switched ON again, it will revert back to the programmed preset level due to the dim-lock feature. The dim-lock feature can be turned OFF if, while programming the preset level, the user selects an intensity preset level that is so low that load 108 will effectively be turned OFF if set at that level. When the dim-lock feature is OFF, the user can select the preset level by manipulating the intensity switches while the load is OFF and then when the load is switched ON, it will go to that preset level.

The user also can press and hold an actuator for a period of time (for example, three seconds or more), allowing controller 126 switch ON load 108 by proper gating of switching circuit 116 causing load 108 to turn ON at a first fixed fade rate that cannot be changed by the user. This first fixed fade rate (e.g., 10 sec.) can be set by the manufacturer of dimmer 100 and the user may, in some embodiments, not be able to modify it. Furthermore, when the actuator is pressed and held, load 108 will go to a fixed intensity level different from the preset level programmed by the user. The fixed level may, in some embodiments, not be changed by the user, but can be set by the manufacturer of dimmer 100. It should be noted that when the intensity adjustment switch(es), or the ON/OFF switch, is actuated while load 108 is fading up from an OFF state, load 108 can return to the OFF state.

When load 108 is ON and a user desires to switch it OFF, the user can actuate an ON/OFF switch once causing one switch closure (to be followed by at least 1 second of no switch closures), which can be detected by controller 126 which engages switching circuit 116 appropriately to switch OFF load 108 or to switch OFF load 108 at a particular fade rate. The fade rate can be programmed into dimmer 100 by the user while the dimmer is in a programming mode.

The user also can press and hold an actuator for a period of time (for example, one second or more), and controller 126 can switch OFF load 108 by proper gating of switching circuit 116. Load 108 may be switched OFF (without fading) after a delay (defined by the manufacturer) where such delay has no relationship with the length of time the actuator was held. The delay can be a fixed delay and after such delay has elapsed, load 108 can be abruptly switched off, such that there is no fade. When the dim-lock feature is OFF as explained above and the user decreases the intensity of load 108 to a new level through the manipulation of the intensity switches, the new level can become the new preset level. This new preset level can be changed if the user (1) once again changes the intensity level while the load is on; (2) switches off the load and changes the intensity level while the load is OFF; or (3) enters into the programming mode and turns on the dim-lock feature to establish a preset level different from the new level. It should again be noted that while load 108 is fading due to the user operating either the intensity switches or the ON/OFF switch, the user can stop the fading by pressing once either the ON/OFF switch or any of the intensity switches. In this scenario, load 108 can revert to the intensity immediately prior to the start of fading.

In operation of the intensity switches while load 108 is ON, each actuation of the intensity switches by the user can be interpreted as a command to either increase or decrease intensity depending on which intensity switch was operated. Controller 126 can be programmed to increase or decrease the intensity of load 108 by a predefined amount after an intensity switch actuation. In that example, there are no fade rates associated with one actuation to "increase intensity" or one actuation to "decrease intensity" command. That is, actuation of an intensity adjustment switch will not cause load 108 to fade. Instead, load 108 will instantly change intensity to a next intensity level. For example, in an embodiment including a light, the light will brighten or dim to a next brightness level. Controller 126 will then cause the intensity of load 108 to increase or decrease after having recognized the one actuation of the intensity adjustment switch. Thus, a user can increase intensity (or decrease intensity) with the use of a series of single actuations of the intensity adjustment switch. The one actuation of the intensity adjustment switch can comprise a switch closure followed by at least a one second pause. Multiple switch closures with pauses of less than one second between closures may, in some embodiments, not be recognized by the dimmer. In that case, multiple switch closures in relatively rapid succession will not cause any operation to be performed by dimmer 100.

Figure 2:
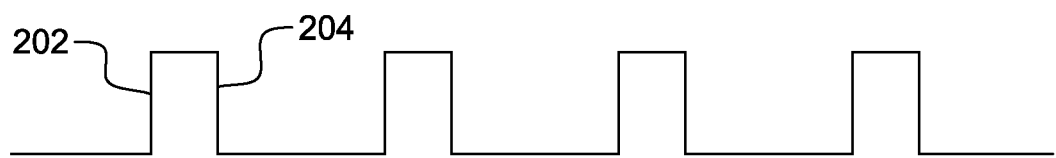
FIG. 2 depicts one embodiment of a zero-crossing waveform for a conventional incandescent light load.

FIG. 2 depicts an embodiment of a zero-crossing waveform for an incandescent light bulb load. The waveform comprises a series of low-state-to-high-state and high-state-to-low-state transitions exhibited through multiple rising edges 202 and falling edges 204 of the zero-crossing waveform. In one example, a rising edge 202 corresponds to a zero-crossing of the power phase (e.g. AC wave) during a transition from a positive polarity to a negative polarity, while a falling edge 204 corresponds to a zero-crossing of the power phase (e.g. AC wave) during a transition from a negative polarity to a positive polarity. In this regard, the zero-crossing waveform and transitions thereof correspond to polarity changes of the AC wave.

In operation, a controller of the dimmer can monitor the zero-crossing waveform received from the zero-crossing detector for a falling edge of the waveform in order to commence a synchronization process using one or more internal timer(s). The timer(s) can be used for different synchronization purposes. In one example, a timer is used to control a delay in the firing of the switching circuit until some duration of time after a zero-crossing has occurred. As is appreciated by those having ordinary skill in the art, dimming a load is accomplished by firing the switching circuit for only a portion of each half-phase (firing at a particular predetermined angle of the phase with respect to the zero-crossing of the phase). The percentage of the half-phase for which the switching circuit is fired will dictate the amount of current supplied to the load during that half-phase, and, when this on/off cycle of the switching circuit is repeated during each half-phase, will dictate the 'dimness' of the load. A timer, for instance a timer of the controller, facilitates properly timing the firing of the switching circuit by counting up (or down), and lapsing (expiring), to indicate that the controller can now fire the switching circuit, which fires for a calculated duration of time before the controller again opens the switching circuit and repeats the cycle.

Furthermore, synchronization of firing a switching circuit of a dimmer can be used to calculate an estimated timing of subsequent zero-crossings of the power phase. In one embodiment, a controller uses the received zero-crossing waveform to synchronize with the power phase once every period of the power phase—that is, it synchronizes with every other phase transition, for instance only those transitions from negative-to-positive voltage polarity. The timing of the other transitions (e.g. from positive to negative), between the transitions being used for synchronization, can then be estimated using a timer and based on the frequency of the phase. If a phase frequency is 60 Hz, for instance, then each half-phase is approximately 8 milliseconds (ms) long, and a zero-crossing is expected approximately every 8 ms. Thus, a controller may detect a falling edge of the zero-crossing waveform in order to initially synchronize at the beginning of a period of the power phase, fire the switching circuit (possibly after some delay) for the remainder of the first half-phase of the period, estimate the timing of the next (e.g. 8 ms after the detected falling edge) transition from the first half-phase to the second half-phase of the period, and fire the switching circuit (possibly after some delay) according to this estimated zero crossing. The controller may then wait for the next falling edge in the zero-crossing waveform to again synchronize, which will be at the beginning of the next phase period.

In some electrical loads, such as in self ballast light-emitting diode (LED) and compact fluorescent lamp (CFL) bulbs, especially in cases where a neutral connection to the dimmer is not available, the zero-crossing waveform provided to the controller may not be as clean as the zero-crossing waveform depicted in FIG. 2. The internal ballast of these loads typically has an input circuit with a bridge rectifier and an energy storing capacitor. When, as a result of charging from the conducting TRIAC from the AC power line, this capacitor reaches a voltage above a momentary voltage in the AC line, diodes in the bridge rectifier stop conducting and the TRIAC will be shut off, as current through it will be below the holding current. For this reason, the zero-crossing at the point of connection by the zero-crossing circuit will not match the zero-crossing in the AC power line. This is a fundamental issue with some loads, such as LED and CFL bulbs. Zero-crossing detection in a 2-wire dimmer will depend on the processes between a dimmer's power supply and the bulb power supply. The zero-crossing waveform for these types of loads exhibit more sensitivity to the multiple zero-crossings experienced during a transition between half-phases, and fluctuations in the zero-crossing waveform occur, in one example, because when a capacitor of the internal light-emitting diode converter is fully charged, the bridge rectifier inside the light-emitting diode bulb disconnects the dimmer from the neutral wire. In contrast, with incandescent bulbs for instance, it is always connected through the small bulb resistance.

Figure 3:
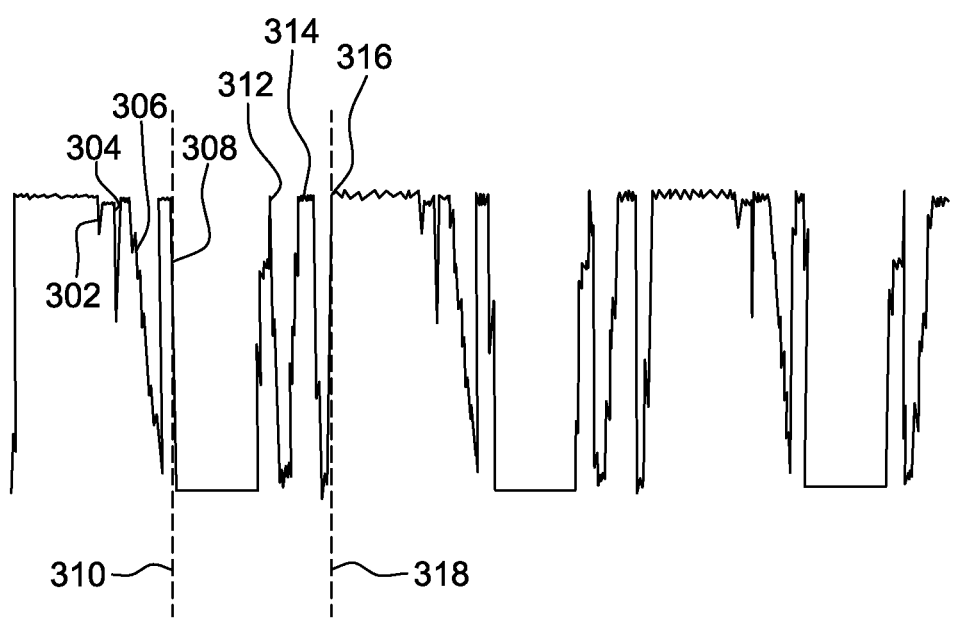
FIG. 3 depicts one embodiment of a zero-crossing waveform for a light-emitting diode (LED) load.

FIG. 3 depicts an embodiment of such a zero-crossing waveform for a light-emitting diode load (in this example). The zero-crossing waveform of FIG. 3 is much more jagged than in FIG. 2, comprising many falling edges 302, 304, 306 and 308 that are all part of one high-to-low transition, corresponding to one transition from one half-phase to another half-phase of the power phase.

The multiple falling edges corresponding to just one high-to-low or low-to-high transition (and hence to one half-phase transition) can cause problems for the controller, causing incorrect synchronization with the zero-crossings of the power phase. Using the falling-edge technique described above for synchronization, the controller might interpret falling edge 302 as a zero-crossing signal that signals occurrence of the zero-crossing. However, in actuality, falling edges 302, 304 and 306 are all false-triggers prior to completion of the transition, whereas falling edge 308 is the falling edge that the controller is interested in for synchronization purposes, since that is what indicates completion of the high-to-low transition (indicated in FIG. 3 by dashed line 310). The controller has no way of knowing at the time it senses falling edge 302 that it is a false-trigger. As a result of the false-triggering, synchronization of the controller to the power phase mistakenly causes the controller to be set ahead of the phase, resulting in, for instance, premature firing of the switching circuit, and causing undesirable consequences. In the case that the load comprises a light-emitting diode bulb, the bulb may exhibit blinking while dimming, as an example.

Similarly, in FIG. 3, rising edges 312 and 314 represent false-triggers of the next zero-crossing. Where the controller synchronizes at each phase period but not at every half-period, the controller is concerned only with falling edges of the zero-crossing waveform, and these rising edge false-triggers do not affect the synchronization. However, if the controller is configured to synchronize every half-period, or if the controller synchronizes at each period using the rising edges of the zero-crossing waveform, then a similar problem of false-triggering is experienced, in that rising edges 312 and 314 are false triggers for rising edge 316 which is the low-to-high transition (indicated by dashed line 318) that the controller is interested in for synchronization purposes.

In accordance with one or more aspects of the present invention, a synchronization algorithm is provided that helps overcome the problems described above with false-triggering. The controller begins synchronizing by starting the timer upon receiving a zero-crossing signal. For instance, it may detect a falling edge of the zero-crossing waveform. Instead of blocking or ignoring subsequent zero-crossing signals (e.g. subsequent falling edges of the zero-crossing waveform), in accordance with an aspect of the present invention, the controller continues to monitor the zero-crossing waveform for a period of time determined by a timer, and, responsive to additional zero-crossing signals (e.g. falling edges of the zero-crossing waveform), restarts the synchronization by restarting the timer. Restarting the timer resets the timer's time interval, delaying expiration of the timer, and hence delaying firing the switching circuit until after the high-to-low transition completes, i.e. after the power phase completes the transition from one half-phase to the other half-phase. Additionally, it avoids multiple firings of the switching circuit if the controller were configured to fire with each falling edge of the zero-crossing waveform.

Figure 4:
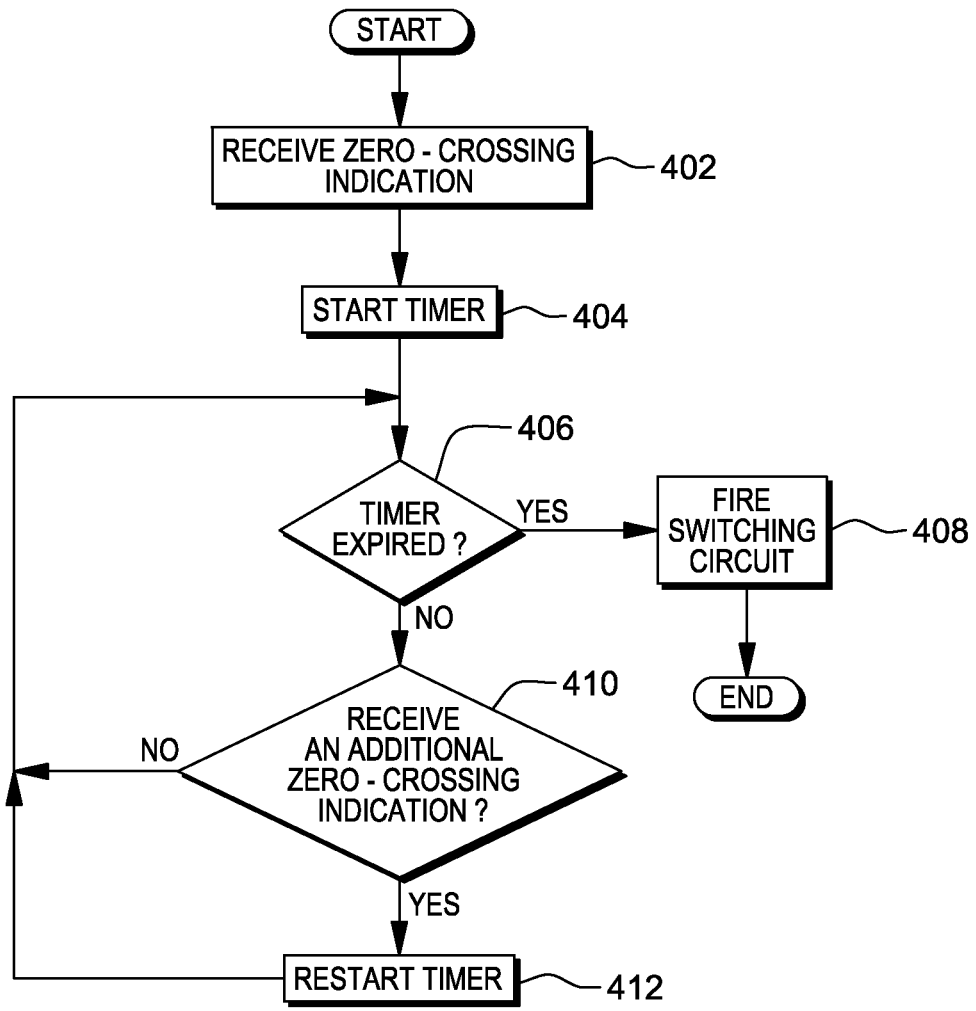
FIG. 4 depicts a process for synchronizing firing a switching circuit of a dimmer with a power phase input, in accordance with one or more aspects of the present invention.

This is further described with reference to FIG. 4, which depicts one embodiment for a process for synchronizing firing a switching circuit of a dimmer with a power phase input (AC wave) to power a load, in accordance with one or more aspects of the present invention. The process of FIG. 4 is used to selective provide electrical power to a load by controlling the switching circuit with respect to zero-crossings of, e.g. an AC wave. In one particular embodiment, the load includes one or more light bulbs which include one or more light emitting diode bulbs and/or one or more compact fluorescent bulbs.

The process of FIG. 4 begins with receipt of a zero-crossing indication, such as a zero-crossing signal (402). In one example, the zero-crossing signal is received by way of a received zero-crossing waveform and the signal signals a zero-crossing of the AC wave (for instance signaled by a falling edge of a zero-crossing signal, e.g. 302 of FIG. 3). Responsive to receiving the zero-crossing signal, a timer is started (404). The timer comprises a predetermined time interval, or timeout, which is an amount of time after which the timer expires. The process then determines whether the timer has expired, that is whether the predetermined time interval as expired (406), and if so, the switching circuit is fired (energized) (408) to supply electrical power to the load. In one embodiment, the switching circuit is energized at a predetermined firing angle with respect to the zero-crossing signal. However, if the timer has not expired, meaning the predetermined time interval has not yet lapsed, it is determined whether a subsequent zero-crossing signal, such as a subsequent falling edge, is received (410). If not, the process returns to 406 where it is again determined whether the timer has expired. If, instead, at 410 a subsequent zero-crossing signal is received, then the timer is restarted (412) and the process returns to 406. By restarting the timer, the predetermined time interval is restarted with each zero-crossing signal that is received prior to expiration of the timer. This ensures that only the zero-crossing signal of interest (e.g. the last signal) affects the synchronization, because restarting the timer nullifies synchronization to the false-trigger(s) received prior to the zero-crossing signal of interest.

In accordance with an aspect of the present invention, the timer can be configured so that its timeout is a predetermined time interval which defines a predetermined firing angle on the AC wave. The predetermined time interval can be greater than the expected amount of time between false-triggers of the zero-crossing waveform, but short enough that it can provide meaningful synchronization for filing the switching circuit (for instance is it less than an amount of time between consecutive phase periods or half-cycle periods of the input power phase (AC wave)). Referring to FIG. 3, the timer will start when the first zero-crossing signal (falling edge) 302 of the zero-crossing waveform is received. It is desirable that the time interval be greater than the time between falling edges 302 and 304, between 304 and 306, and between 306 and 308. If the time interval is not greater, then the interval would expire, indicating that a zero-crossing has already occurred, and the switching circuit could be fired prematurely. Instead, when the time interval is sufficiently long, the timer will restart responsive to receiving the additional zero-crossing signal (falling edge) 404, and again responsive to falling edges 306 and 308.

Additionally, the time interval should be set to a small enough value that the timer expires shortly after falling edge 308 is received. There is a delay in confirming that a zero-crossing occurred, in that the controller does not verify that a zero-crossing has taken place until the timer has expired. Thus, expiration indicates that a zero-crossing completed some length of time in the past, the length of time being the length of the time interval. If the time interval is too large, then the controller will not recognize the zero-crossing as having taken place until it is potentially too late to fire the switching circuit for any meaningful or desired period of time during the particular half-phase that was entered with the detected zero-crossing. As an example, if the controller is to fire the switching circuit for a duration of time that is half the duration of the half-phase, then setting the timer to have a time interval longer than half the duration of the half-phase would mean that the timer expires after the switching circuit was to be fired. Consequently, the switching circuit would be fired for less than the desired amount of time. Thus, it may be desirable to set the timer with a time interval equal to the amount of time that the controller should wait beyond completion of the transition of the power phase (indicated by falling edge 308 in FIG. 3) before firing the switching circuit.

Expiration of the timer indicates that a zero-crossing has occurred at the time indicated by the last falling-edge that was detected prior to expiration of the timer. In other words, it occurred at time $t_z = t_e - int$, where $t_e$ is the time at which the timer expired and int is the predetermined time interval of the timer. It should be understood that in some embodiments it may be desired to fire the switching circuit immediately upon expiration of the timer, that is, at time $t_e$, while in other embodiments it may not be, for instance when the switching circuit is to be fired at a predetermined firing angle with respect to a received zero-crossing signal that indicted the zero-crossing. It may be desirable to fire the switching circuit at an angle corresponding to some time $t_f$ after the zero-crossing occurred. Expiration of the time interval indicates that a zero-crossing occurred and when (in the past) that zero-crossing occurred, and can be therefore be used to determine when $t_f$ occurs, relative to the time of the zero-crossing. Therefore, responsive to the timer expiring, actions other than, or in addition to, firing the switching circuit could be performed. For instance, expiration of the timer could trigger the start of an additional timer that controls firing the switching circuit, to provide for some delay between expiration of the timer and firing the switching circuit. Alternatively, as noted above, the timer could be set for the total desired delay after the zero-crossing of the power phase, as described above, in which case the timer expires precisely when the switching circuit should be fired.

It should further be understood that the timer could comprises a timer that counts down from some non-zero value and expires upon reaching 0, or alternatively could comprise a timer that starts counting up from 0 to some target non-zero value. The time interval in such cases comprises window of time extending from 0 to the non-zero value. In one example, when the timer commences countdown from a non-zero value, restarting the timer sets the timer back to the non-zero value, at which point the timer continues countdown from the non-zero value, and the timer expires when the timer reaches zero. In another example, starting the timer commences counting-up of the timer from a zero value, and restarting the timer sets the timer back to zero at which point the timer continues counting-up from the zero value, and expires when the timer reaches a target non-zero value. The target non-zero value could be a preset, predefined, and/or pre-specified non-zero value corresponding to an amount of time, as an example.

For completeness, additional features and functions of a dimmer 100 are described below, for example, related to control of the operation thereof.

Electrical loads, such as LED lamps, turn off when the input voltage drops below a minimum operating level (minimum load energization level). For some LED lamps, this turn-off voltage may be lower than the voltage required to turn back on the LED lamp. When the turn-off voltage is significantly lower than the turn-on voltage, meaning that a user can dim the LED lamp down to between the turn-off and turn-on voltages, problems can occur. For instance, if the dimmer is switched off when the voltage is positioned between the turn-off and turn-on voltages, the voltage when the dimmer is switched back on is below the level needed to turn on the LED lamp, and consequently, the lamp will fail to turn on.

A kick-start function provides one solution to this problem. The kick-start function advantageously can power-on the load by applying a sufficient voltage level when the switching circuit is switched to supply power to the load, regardless of the dimmer being set to dim the load to below a minimum voltage level sufficient to power-on the load. The kick-start function applies a voltage above the minimum turn-on voltage for a short period when the lamp is switched on, which will start the lamp. The lamp can then be ramped slowly to the desired dimming level.

Parameters that affect the kick-start function include its intensity and duration. In one particular embodiment of the present invention, a dimmer provides a choice of three modes for three different load scenarios which adjust these parameters. The three different load scenarios correspond to three different types of lamps: some lamps do not require any kick-start, some require a relatively weak kick-start, and others require a relatively strong kick-start. To accommodate these different load types, a dimmer in accordance with aspects of the present invention supports FADE-UP, FADE-DOWN, and KICKSTART MODES.

In FADE-UP mode, no kick-start function is provided. When the dimmer is switched on, the initial intensity of the dimmer is at minimum and ramps up slowly to the desired dimming level, which is set, in one embodiment, by an actuator of the dimmer, for instance by a slide potentiometer.

In FADE-DOWN mode, a mild kick-start function is provided. When the dimmer is switched on, the initial intensity of the dimmer is at a level between minimum and maximum and ramps slowly down (or up) to the desired dimming level set by the slide potentiometer.

In KICKSTART mode, a strong kick-start function is provided. When the dimmer is switched on, the initial intensity of the dimmer is set to a high level and held there for a duration of time. After elapse of this duration of time, the intensity ramps slowly down to the desired dimming level set by the slide potentiometer.

Thus, in accordance with the above, a method for controlling power to a lighting load can be provided, where the lighting load has a minimum load energization level and a maximum power output level. The method can include, for instance, selecting a predetermined initial power-level above the minimum load energization level and below the maximum power output level, selecting a predetermined preset lighting brightness level, energizing the lighting load at the predetermined initial power-level for a predetermined period of time, and transitioning from the predetermined initial power-level to the preset lighting brightness level.

In one particular embodiment of the present invention, a dimmer in accordance with aspects of the present invention can provide ways to adjust the lower limit of its dimming range. A slide potentiometer, for instance, typically selects a dimming level scaled between a lower limit (minimum intensity) and an upper limit (maximum intensity). A minimum intensity adjustment allows the user to select the intensity of this lower limit. The dimmer then can re-scale the dimming range to allow the slide potentiometer to control the dimming level smoothly between the maximum intensity and the newly set minimum intensity. MINIMUM INTENSITY adjustment is further described below.

In one particular embodiment of the present invention, a dimmer in accordance with aspects of the present invention can provide the user with the ability to program and select their choice of KICK-START mode and MINIMUM INTENSITY level. Once selected, both choices can be stored in non-volatile memory of the dimmer. The choices can be made using known techniques for programming a dimmer, for instance by using one or more actuators of the dimmer (such as actuators of user interface 128 of FIG. 1) for programming the dimmer.

In one specific example, actuators of the dimmer can include a slide potentiometer, power toggle switch, and a programming switch of the dimmer, and can be used to program the dimmer according to a user-selected configuration. A programming switch is, in one example, a two-position slide switch, with one position (NORMAL position) corresponding to a NORMAL mode, and the other position (PROGRAM position) corresponding to a PROGRAM mode.

Using the above example, the MINIMUM INTENSITY level may be set by a user. This can be accomplished when the dimmer is in an OFF state and the program switch is in the NORMAL position. The following steps can then be employed to set the MINIMUM INTENSITY level: First, the dimmer is turned on with the power toggle switch. Then, the programming switch is slid to the PROGRAM position. The user then adjusts the desired minimum level using the slide potentiometer. Following this, the programming switch is slid back to the NORMAL position, and the minimum level is saved at that point in memory of the dimmer.

Also using the above example, the KICK-START MODE may also be set by a user using the following steps: With the dimmer in the OFF state, the programming switch is slid to the PROGRAM position. Then, the user chooses the desired kick-start mode using the slide potentiometer before turning the dimmer on: The slide potentiometer being slid all of the way down corresponds to the FADE-UP mode, whereas the slide potentiometer being slid to somewhere near the middle corresponds to FADEDOWN mode, and the slide potentiometer being slid to all of the way up corresponds to KICK-START. Once the desired kick-start mode is chosen, the dimmer is turned on, to observe the selected kick-start mode, the programming switch is slid back to the NORMAL position, and the kick-start mode is saved at that point in memory of the dimmer.

As will be appreciated by one skilled in the art, aspects of the present invention may be embodied as a system, method or computer program product. Accordingly, aspects of the present invention may take the form of an entirely hardware embodiment, an entirely software embodiment (including, but not limited to, firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In one embodiment, the dimmer comprises an embedded microcontroller. In a further embodiment, the dimmer uses a standard microcontroller. Additionally or alternatively, the dimmer can incorporate and/or be incorporated into an application-specific integrated circuit (ASIC).

In one embodiment, a computer program product includes, for instance, one or more computer readable media to store computer readable program code means or logic thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium or loaded onto a computer, which can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A dimmer for controlling electrical power of an AC wave to a load, the dimmer comprising:
    a line input terminal and a load output terminal, the line input terminal coupled to the AC wave, and the load output terminal coupled to the load;
    a switching circuit electrically coupled between the line input terminal and the load output terminal, the switching circuit controlling a supply of electrical power to the load;
    a controller to synchronize firing of the switching circuit with respect to the AC wave to provide electrical power to the load;
    a timer having a predetermined timeout; and
    a zero-crossing detector configured to output a zero-crossing signal indicative of a zero-crossing of the AC wave, wherein receipt of the zero-crossing signal starts the timer, and if a subsequent zero-crossing signal is received prior to reaching the timeout, the timer is restarted, and wherein responsive to reaching the timeout, the controller fires the switching circuit at a predetermined firing angle with respect to the zero-crossing signal to supply electrical power to the load.

2. The dimmer of claim 1, wherein the zero-crossing signal comprises an edge of a zero-crossing waveform derived based on the AC wave, the zero-crossing waveform indicating transitions between polarities of the AC wave.

3. The dimmer of claim 2, wherein the zero-crossing waveform exhibits multiple edges during a transition of the AC wave from one half-phase thereof to another half-phase thereof, and wherein the zero-crossing signal comprises one edge of the multiple edges during the transition and the subsequent zero-crossing signal comprises another edge of the multiple edges during the transition.

4. The dimmer of claim 3, wherein restarting the timer responsive to the another edge of the multiple edges facilitates delaying firing of the switching circuit until after completion of the transition of the AC wave between the one half-phase and the another half-phase, to facilitate avoiding multiple firings of the switching circuit with each exhibited edge of the multiple edges, during the transition of the AC wave from the one half-phase to the another half-phase.

5. The dimmer of claim 1, wherein the load comprises one or more light bulbs selected from the group consisting of at least one light emitting diode bulb and at least one compact fluorescent bulb.

6. The dimmer of claim 1, wherein the load comprises one or more incandescent light bulbs.

7. The dimmer of claim 1, wherein the predetermined timeout comprises a duration of time less than an amount of time between consecutive half-cycle periods of the AC wave.

8. The dimmer of claim 1, wherein starting the timer commences countdown of the timer from a non-zero value, wherein restarting the timer comprises setting the timer back to the non-zero value and recommencing countdown of the timer from the non-zero value, and wherein reaching the timeout comprises the timer reaching zero.

9. The dimmer of claim 1, wherein starting the timer commences counting-up of the timer from a zero value, wherein restarting the timer comprises setting the timer back to zero and recommencing counting-up of the timer from the zero value, and wherein reaching the timeout comprises the timer reaching a target non-zero value.

10. A method of selectively providing electrical power to a load by controlling a switching circuit with respect to a zero-crossing of an AC wave, the method comprising:
    receiving a zero-crossing signal indicative of the occurrence of the zero-crossing of the AC wave;
    responsive to the zero crossing signal, starting a timer for a predetermined time interval;
    wherein if a subsequent zero-crossing signal is received prior to the predetermined time interval elapsing, the timer is restarted; and
    responsive to expiration of the predetermined time interval, energizing the switching circuit at a predetermined firing angle with respect to the zero-crossing signal and providing electrical power to the load.

11. The method of claim 10, wherein the zero-crossing signal comprises an edge of a zero-crossing waveform derived based on the AC wave, the zero-crossing waveform indicating transitions between polarities of the AC wave.

12. The method of claim 11, wherein the zero-crossing waveform exhibits multiple edges during a transition of the AC wave from one half-phase thereof to another half-phase thereof, and wherein the zero-crossing signal comprises one edge of the multiple edges during the transition and the subsequent zero-crossing signal comprises another edge of the multiple edges during the transition.

13. The method of claim 12, wherein responsive to receiving the subsequent zero-crossing signal, the timer is restarted, and the restarting facilitates delaying energizing the switching circuit until after completion of the transition of the AC wave from the one half-phase to the another half-phase, to facilitate avoiding multiple firings of the switching circuit with each exhibited edge of the multiple edges, during the transition of the AC wave from the one half-phase to the another half-phase.

14. The method of claim 10, wherein the load comprises one or more light bulbs selected from the group consisting of at least one light emitting diode bulb and at least one compact fluorescent bulb.

15. The method of claim 10, wherein the predetermined time interval comprises a duration of time less than an amount of time between consecutive half-cycle periods of the AC wave.

16. The method of claim 10, wherein starting the timer commences countdown of the timer from a non-zero value, wherein restarting the timer comprises setting the timer back to the non-zero value and recommencing countdown of the timer from the non-zero value, and wherein expiration of the predetermined time interval comprises the timer reaching zero.

17. The method of claim 10, wherein starting the timer commences counting-up of the timer from a zero value, wherein restarting the timer comprises setting the timer back to zero and recommencing counting-up of the timer from the zero value, and wherein expiration of the predetermined time interval comprises the timer reaching a target non-zero value.

* * * * *